United States Patent
Lai et al.

(10) Patent No.: US 12,431,667 B2
(45) Date of Patent: Sep. 30, 2025

(54) ELASTIC BUCKLING ELEMENT AND ELECTRONIC DEVICE USING THE SAME

(71) Applicant: Pegatron Corporation, Taipei (TW)

(72) Inventors: Yu-Peng Lai, Taipei (TW); Hui-Chen Wang, Taipei (TW); Chan-Wei Kuo, Taipei (TW); Chuan-Yuan Lin, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 316 days.

(21) Appl. No.: 18/325,201

(22) Filed: May 30, 2023

(65) Prior Publication Data
US 2024/0055803 A1    Feb. 15, 2024

(30) Foreign Application Priority Data
Aug. 11, 2022   (TW) .................................. 111130264

(51) Int. Cl.
*H05K 7/02*      (2006.01)
*G06F 1/18*      (2006.01)
*H01R 13/639*    (2006.01)

(52) U.S. Cl.
CPC .......... *H01R 13/639* (2013.01); *G06F 1/186* (2013.01)

(58) Field of Classification Search
CPC .............. H01R 13/639; H01R 12/7058; H01R 12/7068
See application file for complete search history.

(56) References Cited

U.S. PATENT DOCUMENTS

| | | | | |
|---|---|---|---|---|
| 6,351,388 B1* | 2/2002 | Jenkins | ................... | G06F 1/163 361/730 |
| 7,074,090 B2* | 7/2006 | Ho | .................. | H01R 12/52 439/326 |
| 7,294,009 B1* | 11/2007 | Peng | ..................... | H01R 12/716 439/64 |
| 7,300,298 B2* | 11/2007 | Kameda | ................. | H01R 12/83 439/326 |
| 7,470,136 B2 | 12/2008 | Yahiro | | |
| 8,085,552 B2* | 12/2011 | Takao | .................... | H05K 3/368 361/810 |

(Continued)

FOREIGN PATENT DOCUMENTS

| | | |
|---|---|---|
| CN | 107807723 A | 3/2018 |
| TW | 201308785 A | 2/2013 |

OTHER PUBLICATIONS

EP Search Report dated Jan. 9, 2024 in EP application No. 23179026.2-1206.

*Primary Examiner* — Neil Abrams
(74) *Attorney, Agent, or Firm* — McClure, Qualey & Rodack, LLP

(57) ABSTRACT

An elastic buckling element includes a base and an elastic buckling portion. The base includes a bearing surface, and the bearing surface defines a horizontal direction parallel to the bearing surface and a vertical direction perpendicular to the bearing surface, one end of the elastic buckling portion is fixed on the bearing surface of the base, and the elastic buckling portion and the base have a first height in the vertical direction, and the elastic buckling portion is arranged along the horizontal direction and has a horizontal extension length in the horizontal direction, wherein the horizontal extension length is greater than the first height.

10 Claims, 5 Drawing Sheets

(56) References Cited

U.S. PATENT DOCUMENTS 8,355,261 B2 1/2013 Gordon
11,196,195 B2 * 12/2021 Bettman ................ H01R 12/73
2005/0048828 A1 3/2005 Ho et al.

* cited by examiner

ELASTIC BUCKLING ELEMENT AND ELECTRONIC DEVICE USING THE SAME

This application claims the benefit of Taiwan application Serial No. 111130264, filed Aug. 11, 2022, the subject matter of which is incorporated herein by reference.

BACKGROUND OF THE INVENTION

Field of the Invention

The invention relates in general to a buckling device, and more particularly to an elastic buckling element and an electronic device using the same.

Description of the Related Art

Commonly used handheld electronic devices include mobile phones, tablet computers, notebook computers or e-books. In order to make the handheld electronic devices lighter and thinner, more electronic components with smaller volume and thinner thickness are used, and multiple expansion card connectors can be disposed in the handheld electronic device for the convenience that the users can install expansion cards (or memory cards) in the handheld electronic device. The expansion card can be connected to the expansion card connector through the slot, and then the expansion card is fixed on the circuit board through locking screws or fasteners.

If it is necessary to use tools such as a screwdriver for fixing locking screws, the user may encounter the risk of screw loss during the installation or disassembly process, and screw loss will cause confusion for the user. If the expansion card is fixed with the fastener, the risk of screw loss during installation or disassembly process can be reduced, however, the height and space requirements of the fastener will exceed the allowable height limit of the housing. Once the height of the fastener is reduced, it is not easy to operate due to the small size of the fastener and the force applied to the fastener beyond the yield point of the material will result in permanent deformation of the fastener, and thus the fastener cannot be used many times.

SUMMARY OF THE INVENTION

The present invention relates to an elastic buckling element and an electronic device using the same for buckling an electronic component.

According to one aspect of the present invention, an elastic buckling element, being disposed on a supporting surface, is provided. The elastic buckling element includes a base and an elastic buckling portion. The base includes a bearing surface, the bearing surface defines a horizontal direction parallel to the bearing surface and a vertical direction perpendicular to the bearing surface, one end of the elastic buckling portion is fixed on the bearing surface of the base, and the elastic buckling portion and the base have a first height relative to the supporting surface in the vertical direction, and the elastic buckling portion is arranged along the horizontal direction and has a horizontal extension length relative to the base in the horizontal direction, wherein the horizontal extension length is greater than the first height.

According to one aspect of the present invention, an electronic device, including a circuit board, a connector, an expansion card, and an elastic buckling element, is provided. The circuit board includes a surface. The connector is arranged on the surface of the circuit board. The expansion card is arranged on the surface of the circuit board and electrically connected with the connector. The elastic buckling element is arranged on the surface of the circuit board, and the expansion card is fixed on the surface of the circuit board through the elastic buckling element, wherein the elastic buckling element is a horizontally extending fastener.

The above and other aspects of the invention will become better understood with regard to the following detailed description of the preferred but non-limiting embodiment(s). The following description is made with reference to the accompanying drawings.

DETAILED DESCRIPTION OF THE INVENTION

Below in conjunction with the accompanying drawings in the embodiments of the application, the technical solutions in the embodiments of the application are clearly and completely described. Obviously, the described embodiments are a part of the embodiments of the application, rather than all embodiments. Based on the embodiments in the present application, all other embodiments obtained by those skilled in the art on the premise of being obvious belong to the protection scope of the present application. The same/similar symbols are used to represent the same/similar components in the following description.

Figure 1:
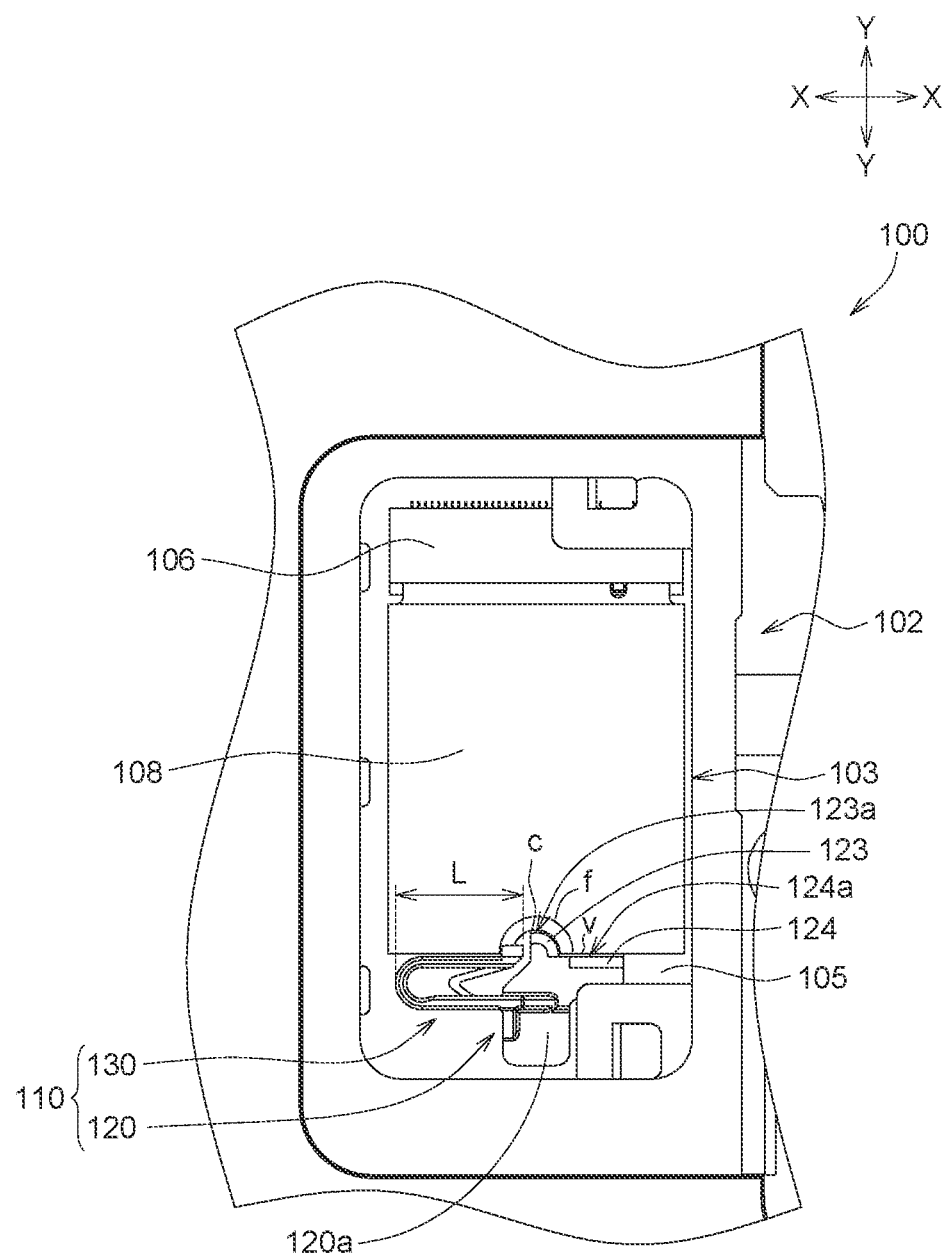
FIG. 1 is a schematic top view of an electronic device according to an embodiment of the present invention.
Figure 2:
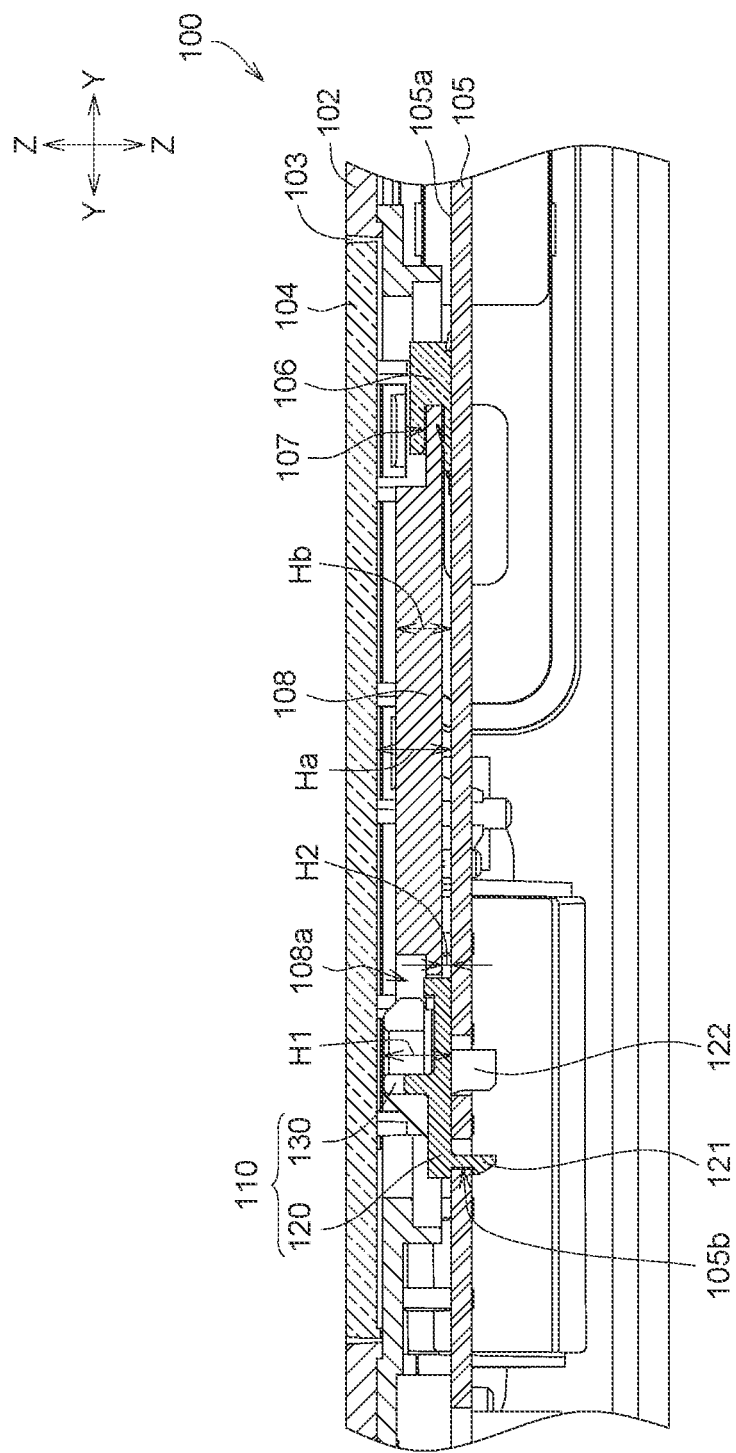
FIG. 2 is a schematic cross-sectional view of an electronic device along Y-Y axis according to an embodiment of the present invention.

Referring to FIG. 1 and FIG. 2, FIG. 1 and FIG. 2 respectively illustrate a schematic top view and a schematic cross-sectional view of an electronic device 100 along the Y-Y axis according to an embodiment of the present invention. In FIG. 1, the cover 104 covering the opening 103 of the housing 102 is removed in order to clearly see the internal configuration of the housing 102. In FIG. 2, an example is shown in which the cover 104 covers the opening 103 of the housing 102. The electronic device 100 is, for example, a lightweight electronic device such as a notebook computer.

The electronic device 100 may include a housing 102, a cover 104, a circuit board 105, a connector 106, an expansion card 108, and an elastic buckling element 110. The circuit board 105 is disposed in the housing 102, the circuit board 105 includes a surface 105a (i.e., supporting surface), and the connector 106 is arranged on the surface 105a of the circuit board 105. The expansion card 108 is arranged on the surface 105a of the circuit board 105 and is electrically connected to the connector 106. In addition, the elastic buckling element 110 is disposed on the surface 105a of the circuit board 105, and the expansion card 108 is fixed on the surface 105a of the circuit board 105 through the elastic buckling element 110. The elastic buckling element 110 is a horizontally extending fastener.

As shown in FIGS. 1 and 2, the elastic buckling element 110 can be arranged on the surface 105a (e.g., the upper surface) of the circuit board 105, and the elastic buckling element 110 includes a base 120 and an elastic buckling portion 130. The base 120 includes a bearing surface 120*a*, and the bearing surface 120*a* defines a horizontal direction parallel to the bearing surface 120*a* (such as the X-X axis or Y-Y axis) and a vertical direction perpendicular to the bearing surface 120*a* (such as the Z-Z axis). The base 120 is located on an opposite side of the connector 106, and one end of the elastic buckling portion 130 is fixed on the bearing surface 120*a* of the base 120, and the elastic buckling portion 130 and the base 120 jointly have a first height H1 relative to the surface 105*a* of the circuit board 105 in the vertical direction, and the elastic buckling portion 130 is arranged along the horizontal direction and has a horizontal extension length L relative to the base 120 in the horizontal direction, wherein the horizontal extension length L is greater than the first height H1.

As shown in FIG. 2, there is an accommodating space between the cover 104 and the circuit board 105, and the expansion card 108 is arranged in the accommodating space, and the expansion card 108 is electrically connected to the connector 106 through the slot 107. Due to the limited accommodating space inside the housing 102, the distance Hb from the top of the expansion card 108 to the surface 105*a* of the circuit board 105 needs to be less than a predetermined height (i.e., the distance Ha between the bottom surface of the cover 104 and the surface 105*a* of the circuit board 105). In addition, the height from the top of the elastic buckling portion 130 to the surface 105*a* of the circuit board 105 (i.e., the first height H1) also needs to be less than a predetermined height (the distance Ha), so that the elastic buckling portion 130 can be accommodated in the housing 102.

In one embodiment, the height of the elastic buckling portion 130 and the base 120 in the direction of Z-Z axis (i.e., the first height H1) is about 3.35 mm and lower than the height of the cover plate 104. In addition, the distance Hb from the top of the expansion card 108 to the surface 105*a* of the circuit board 105 is about 2.75 mm. That is to say, the distance (i.e., first height H1) between the top of the elastic buckling portion 130 and the surface 105*a* of the circuit board 105 is substantially greater than or equal to the distance Hb from the top of the expansion card 108 to the surface 105*a* of the circuit board 105, but less than the distance Ha between the bottom surface of the cover 104 and the surface 105*a* of the circuit board 105.

In this embodiment, since the conventional vertically extending fastener is replaced by a horizontally extending fastener, the distance (i.e., first height H1) between the top of the elastic buckling portion 130 and the surface 105*a* of the circuit board 105 is significantly reduced. In addition, the horizontal extension length L of the elastic buckling portion 130 is greater than the first height H1, so that the horizontal dimension and operability of the elastic buckling portion 130 can be increased, and since the horizontal dimension of the elastic buckling portion 130 is enlarged, the force applied to the elastic buckling portion 130 is not easy to exceed the yield point of the material, the permanent deformation of the elastic buckling portion 130 is avoided and can be used for many times.

The yield point (or yield strength) is the stress value at which a ductile material begins to deform plastically (permanent deformation) when the ductile material is stressed. When the stress is less than the yield strength, the deformation of the ductile material belongs to elastic deformation; when the stress is removed, the ductile material will return to its original state. Otherwise, when the stress continues to increase and exceeds the yield strength, the ductile material will be plastically deformed; when the stress is removed, the ductile material will not return to its original state and deform permanently.

Compared with a vertically extending fastener and a horizontally extending fastener with the same height (for example, 3.35 mm), when an external force is applied, the elastic arm of the vertically extending fastener is shorter, so that the buckling portion of the vertically extending fastener reaches the yield point by moving a horizontal displacement of 0.23 mm. While the horizontal extension fastener has a longer elastic arm (for example, horizontal extension dimension L is 8-8.5 mm), so that the buckling portion 134 of the horizontal extension fastener reaches the yield point by moving a horizontal displacement of 1.2 mm (the horizontal displacement as shown in FIG. 3B). In addition, in condition of the horizontal displacement is 0.9 mm, the maximum stress (for example, 111 MPa) and applied force (for example, 1.4 lb) of the buckling portion 134 of the horizontally extending fastener is also less than the maximum stress (for example, 141.5 MPa) and applied force (for example, 10.1 lb) of the buckling portion of the vertically extending fastener, so that it is easy to operate. Therefore, in terms of fastener, the horizontally extending fastener has better repeatability than the vertically extending fastener, does not occupy too much space inside the housing 102 than the vertically extending fastener and is easier to operate.

Figure 3A:
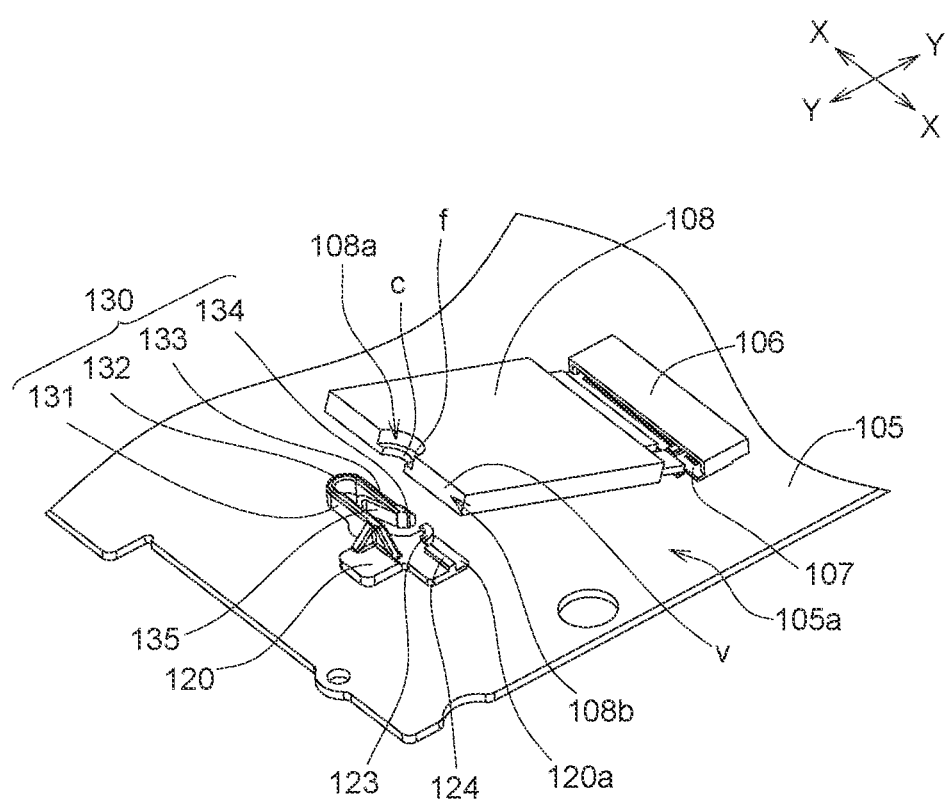
FIGS. 3A and 3B respectively illustrate schematic views of mounting an electronic component on a circuit board.
Figure 3B:
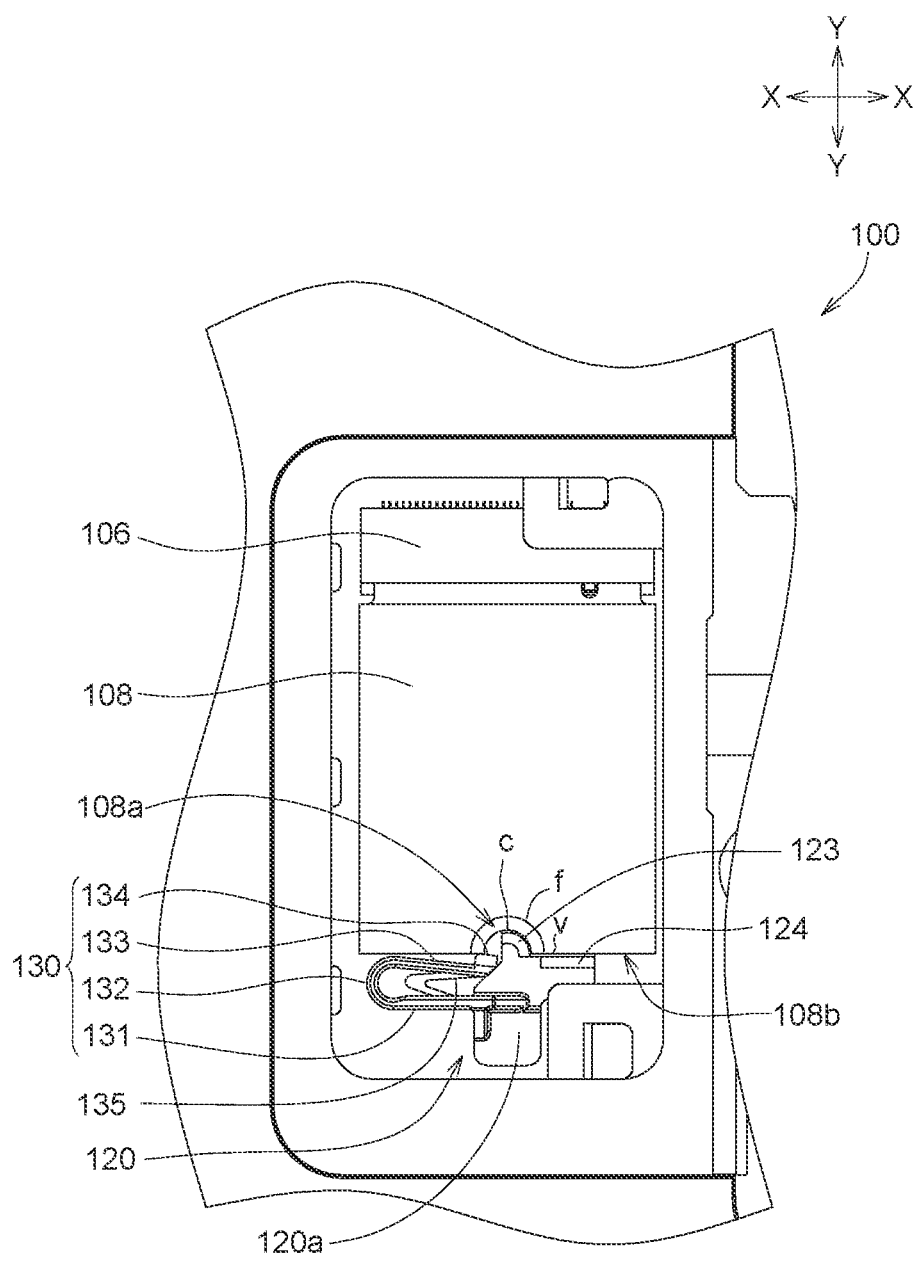
Figure 4A:
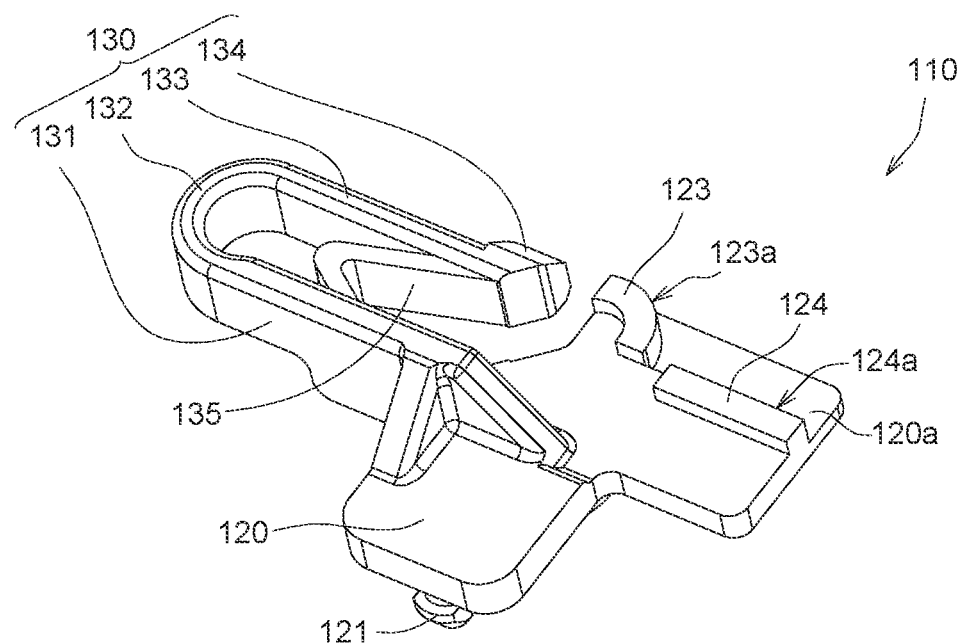
FIGS. 4A and 4B respectively illustrate three-dimensional views of an elastic buckling element according to an embodiment of the present invention.
Figure 4B:
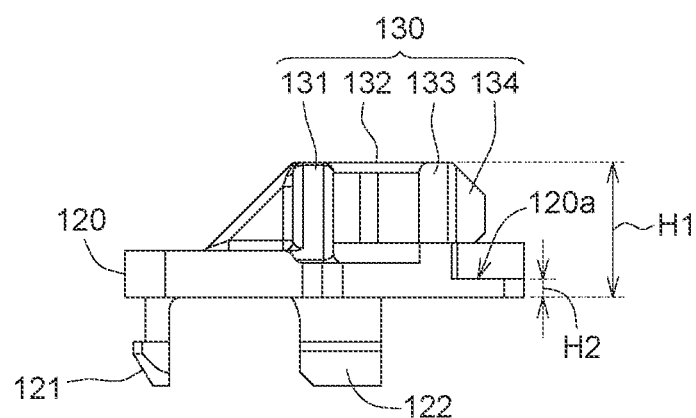

Referring to FIGS. 3A, 3B, 4A and 4B, FIGS. 3A and 3B respectively illustrate a schematic view of mounting the expansion card 108 on the circuit board 105, and FIGS. 4A and 4B respectively illustrate three-dimensional schematic views of an elastic buckling element 110 according to an embodiment of the present invention.

As shown in FIGS. 3A, 3B, 4A, and 4B, the base 120 is, for example, disposed on the surface 105*a* of the circuit board 105, and the bottom of the base 120 has at least one fixed post 121 and 122 (or fixed feet). The posts 121 and 122 can be engaged with the circuit board 105 through the openings 105*b* of the circuit board 105 (see FIG. 2). The fixing posts 121 and 122 (or fixing feet) are integrally formed with the base 120 by injection molding, for example. In another embodiment, the fixing posts 121 and 122 can be integrated with the base 120 in a plug-in manner.

In addition, the base 120 has, for example, a first positioning member 123 and a second positioning member 124, the first positioning member 123 and the second positioning member 124 are arranged on the bearing surface 120*a* (such as the X-Y bearing surface), and the second positioning member 123 has an arc surface 123*a*, and a second positioning member 124 has a vertical surface 124*a*. The bearing surface 120*a* has a second height H2 relative to the surface 105*a* of the circuit board 105 (see FIG. 2), and the second height H2 is smaller than the first height H1. When the expansion card 108 is installed on the circuit board 105, one side of the expansion card 108 can rest on the bearing surface 120*a*.

The arc surface 123*a* of the first positioning member 123 can abut against an arc surface c of the expansion card 108, and the vertical surface 124*a* of the second positioning member 124 can abut against a vertical surface v of the expansion card 108. The first positioning member 123 is, for example, a positioning member in the X-Y dimension, and the second positioning member 124 is a one-dimensional or two-dimensional positioning member, and the two members complement each other in terms of positioning. The arc surface c of the expansion card 108 is, for example, the wall surface of the existing structure (e.g., screw hole), and no special design is required. In addition, the vertical surface v of the expansion card 108 is, for example, the side wall surface of the existing structure, and no special design is required.

As shown in FIG. 3A, the expansion card 108 has a semicircular hole 108a and a side 108b. The expansion card 108 has the semicircular hole 108a and an arc surface c (i.e., hole wall) adjacent to the semicircular hole 108a, and the expansion card 108 further has a stepped surface f adjacent to the semicircular hole 108a, and the surface of the side 108b is a vertical surface v adjacent to the semicircular hole 108a. When installing the expansion card 108 on the circuit board 105, one side of the expansion card 108 is inserted into the slot 107 of the connector 106, and then the other side of the expansion card 108 is rotated to make the other side of the expansion card 108 substantially parallel to the elastic buckling element 110. At this moment, the arc surface 123a of the first positioning member 123 is located in the semicircular hole 108a of the expansion card 108, and the arc surface 123a of the first positioning member 123 can abut against the arc surface c that is adjacent to the semicircular hole 108a, so that the X-axis direction and the Y-axis direction of the expansion card 108 can be limited by the first positioning member 123. In addition, the vertical surface 124a of the second positioning member 124 can be opposite to the vertical surface v of the side 108b of the expansion card 108, so the Y-axis direction of the expansion card 108 can be limited by the second positioning member 124.

In addition, the elastic buckling portion 130, being a horizontally extending fastener, has a first elastic arm 131, a curved portion 132 and a second elastic arm 133. The first elastic arm 131 is connected to the bearing surface 120a of the base 120, and the curved portion 132 is located between the first elastic arm 131 and the second elastic arm 133 to form a U-shaped elastic arm.

As shown in FIGS. 1, 3A and 3B, the horizontal extension lengths L of the first elastic arm 131 and the second elastic arm 133 are substantially the same. In another embodiment, the length of the first elastic arm 131 is greater than the length of the second elastic arm 133, for example, the length of the second elastic arm 133 is two-thirds or half of the length of the first elastic arm 131. The present application is no restriction thereon.

The first elastic arm 131, the curved portion 132 and the second elastic arm 133 are formed, for example, by plastic injection molding, and the material thereof are one of thermosetting plastics, for example, nylon, polypropylene (PP), epoxy resin (EP), unsaturated polyester (UP), polyurethane resin (PU), silicone resin, silicon dioxide or thermoplastic plastics, for example, ABS resin and polycarbonate (PC).

Referring to FIG. 3B, when an external force is applied, the second elastic arm 133 can move relative to the first elastic arm 131 to generate a horizontal displacement, and when the external force is removed, the second elastic arm 133 can rebound to its initial position. For example, one end of the second elastic arm 133 has a buckling portion 134, the user can press the buckling portion 134 along the horizontal direction, and the buckling portion 134 is pushed and retracted inwards. Next, when the buckling portion 134 is retracted, the expansion card 108 can move downward and be disposed on the surface 105a of the circuit board 105 without interfering with the buckling portion 134. After the expansion card 108 is installed, the buckling portion 134 is released, and the buckling portion 134 rebounds to its initial position by its own elastic force. At the same time, the Z-axis direction of the expansion card 108 is limited by the buckling portion 134. For example, the buckling portion 134 abuts against a surface of the expansion card 108 (e.g., the stepped surface f adjacent to the semicircular hole 108a), so that the movement of the expansion card 108 in the Z-axis direction can be restricted by the buckling portion 134. That is to say, the expansion card 108 and the buckling portion 134 interfere with each other and are positioned in the vertical direction (Z-Z axis).

In this embodiment, since the horizontal extension length L of the elastic buckling portion 130 is significantly greater than the first height H1 of the elastic buckling portion 130, that is to say, the elastic buckling portion 130 is not vertically arranged on the surface 105a of the circuit board 105, so that the elastic buckling portion 130 will not be limited by the allowable height of the housing 102 in the vertical direction (Z-Z axis). In addition, in the X-X axis direction and Y-Y axis direction, the expansion card 108 is positioned between the elastic buckling element 110 and the connector 106 by the first positioning member 123 and the second positioning member 124, and in the Z-Z axis direction, the expansion card 108 is positioned by the buckling portion 134 and cannot move in the Z-Z axis direction, so that the expansion card 108 is fixed on the circuit board 105 without screws and the risk of screw loss during installation or disassembly process can be reduced.

On the other hand, the elastic buckling portion 130 may further include a stiffener 135 connecting the first elastic arm 131 and the second elastic arm 133. The stiffener 135 is, for example, V-shaped or other shapes, one end of the stiffener 135 is connected to the middle of the first elastic arm 131, and the other end of the stiffener 135 is connected to the end of the second elastic arm 133. Due to the small size of the stiffener 135, the stiffener 135 can be accommodated in the space between the first elastic arm 131 and the second elastic arm 133, and assist the elastic arm to resist external force or reinforce the structure of the elastic buckling portion 130 to improve the yield strength of the elastic buckling portion 130. The stiffener 135 can be formed integrally with other parts of the elastic buckling portion 130, such as injection molding; on the other hand, the stiffener 135 can be formed by other alternative components, such as a spring or a supporting rib.

The elastic buckling element and the electronic device using the same according to the above embodiments of the present invention adopt a horizontally extending fastener instead of traditional vertically extending fastener, which can reduce the height space requirements of fastener. Once the height of the vertically extending fastener is reduced, it will also have the disadvantage of being difficult to operate due to the small size of the fastener, and when the force applied to the vertical extending fastener beyond the yield point of material, the force will result in permanent deformation of the vertically extending fastener and the fastener cannot be used. Compared with the vertically extending fastener, the horizontal dimension of the horizontally extending fastener is enlarged, it is not easy to apply force beyond the yield point of material and the fastener has better repeatability than the vertically extending fastener, does not occupy too much space inside the housing than the vertically extending fastener and is easier to operate.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An elastic buckling element, being arranged on a supporting surface, the elastic buckling element comprising:
    a base comprising a bearing surface, the bearing surface defining a horizontal direction parallel to the bearing surface and a vertical direction perpendicular to the bearing surface; and
    an elastic buckling portion, wherein one end of the elastic buckling portion is fixed on the bearing surface of the base, the elastic buckling portion and the base have a first height relative to the supporting surface in the vertical direction, and the elastic buckling portion is arranged along the horizontal direction and has a horizontal extension length relative to the base in the horizontal direction, wherein the horizontal extension length is greater than the first height,
    wherein the elastic buckling portion has a first elastic arm, a curved portion and a second elastic arm, the first elastic arm is connected to the base, and the curved portion is located between the first elastic arm and the second elastic arm to form a U-shaped elastic arm.

2. The elastic buckling element according to claim 1, wherein the base has a first positioning member and a second positioning member, the first positioning member and the second positioning member are arranged on the bearing surface, the first positioning member has an arc surface, and the second positioning member has a vertical surface.

3. The elastic buckling element according to claim 1, an end of the second elastic arm further having a buckling portion, wherein when a force is applied on the buckling portion, the buckling portion is adapted to generate a displacement in the horizontal direction.

4. The elastic buckling element according to claim 1, wherein the elastic buckling portion further comprises a stiffener, one end of the stiffener is connected to the first elastic arm, and the other end of the stiffener is connected to the second elastic arm.

5. An electronic device comprising:
    a circuit board comprising a surface;
    a connector disposed on the surface of the circuit board;
    an expansion card disposed on the surface of the circuit board and electrically connected with the connector; and
    an elastic buckling element arranged on the surface of the circuit board, and the expansion card is fixed on the surface of the circuit board through the elastic buckling element, wherein the elastic buckling element is a horizontally extending fastener,
    wherein the elastic buckling element has a first elastic arm, a curved portion and a second elastic arm, the first elastic arm is connected to the base, and the curved portion is located between the first elastic arm and the second elastic arm to form a U-shaped elastic arm.

6. The electronic device according to claim 5, wherein the elastic buckling element comprises:
    a base comprising a bearing surface that defines a horizontal direction parallel to the bearing surface and a vertical direction perpendicular to the bearing surface; and
    an elastic buckling portion, wherein one end of the elastic buckling portion is fixed on the bearing surface of the base, the elastic buckling portion and the base have a first height in the vertical direction, and the elastic buckling portion is arranged along the horizontal direction and has a horizontal extension length in the horizontal direction, wherein the horizontal extension length is greater than the first height.

7. The electronic device according to claim 6, wherein the base is located on an opposite side of the connector, and a bottom of the base further comprises at least one fixing post, and the at least one fixing post passes through an opening of the circuit board and engages with the circuit board.

8. The electronic device according to claim 6, wherein the expansion card has a semicircular hole and an arc surface in the semicircular hole, and the expansion card further has a stepped surface in the semicircular hole, the stepped surface and the elastic buckling portion interfere with each other to position the expansion card.

9. The electronic device according to claim 6, wherein the expansion card has a semicircular hole and a side, the expansion card has an arc surface adjacent to the semicircular hole, and the side is a vertical surface, the base has a first positioning member and a second positioning member, the first positioning member and the second positioning member are arranged on the bearing surface, the first positioning member has an arc surface, and the second positioning member has a vertical surface, the arc surface of the first positioning member abuts against the arc surface of the expansion card, and the vertical surface of the second positioning member abuts against the side of the expansion card.

10. The electronic device according to claim 5, further comprising a housing, wherein the housing has an opening and a cover covering the opening, the cover is separated from the circuit board by a distance, and the first height is less than the distance.

* * * * *